United States Patent
Presley

[11] B 3,984,713
[45] Oct. 5, 1976

[54] MAGNETIC SPEED SENSOR WITH COMPENSATING POLE

[75] Inventor: Rex Wallace Presley, Livonia, Mich.

[73] Assignee: The Bendix Corporation, South Bend, Ind.

[22] Filed: July 1, 1975

[21] Appl. No.: 592,143

[44] Published under the second Trial Voluntary Protest Program on January 27, 1976 as document No. B 592,143.

Related U.S. Application Data
[63] Continuation of Ser. No. 478,988, April 4, 1975.

[52] U.S. Cl. .............................. 310/155; 310/168
[51] Int. Cl.² ........................................ H02K 21/38
[58] Field of Search ................ 310/111, 168–170, 310/152–156, 268; 336/135; 340/194

[56] References Cited
UNITED STATES PATENTS

| | | | |
|---|---|---|---|
| 2,161,256 | 6/1939 | Karcher | 310/155 X |
| 2,756,357 | 7/1956 | Schaberg | 336/135 X |
| 2,820,915 | 1/1958 | Mathews | 310/168 |
| 2,853,638 | 9/1958 | Bonnano et al. | 310/155 UX |
| 3,564,313 | 2/1971 | Goor | 310/168 |
| 3,825,782 | 7/1974 | Dassler | 310/168 |

*Primary Examiner*—Donovan F. Duggan
*Attorney, Agent, or Firm*—Ken C. Decker; S. H. Hartz

[57] ABSTRACT

A speed sensor for a vehicle wheel having a rotating tone wheel and a stationary magnetic sensor with a sensing pole proximate the tone wheel teeth and a compensating pole proximate the tone wheel spaced from the tone wheel teeth. The sensing pole and compensating pole are secured to the ends of a permanent magnet in U-shaped configuration and coils connected in series opposition are wound on the sensing and compensating poles. Noise components generated in the sensing coil with the speed signal voltage due to axial misalignment and vibration of the tone wheel are cancelled by corresponding noise components generated in the compensating coil to provide a substantially noise free signal voltage corresponding to wheel speed.

5 Claims, 2 Drawing Figures

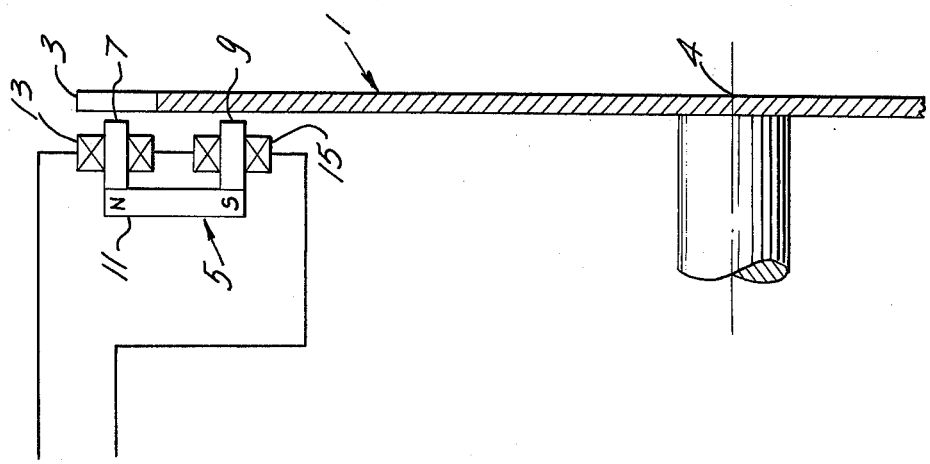
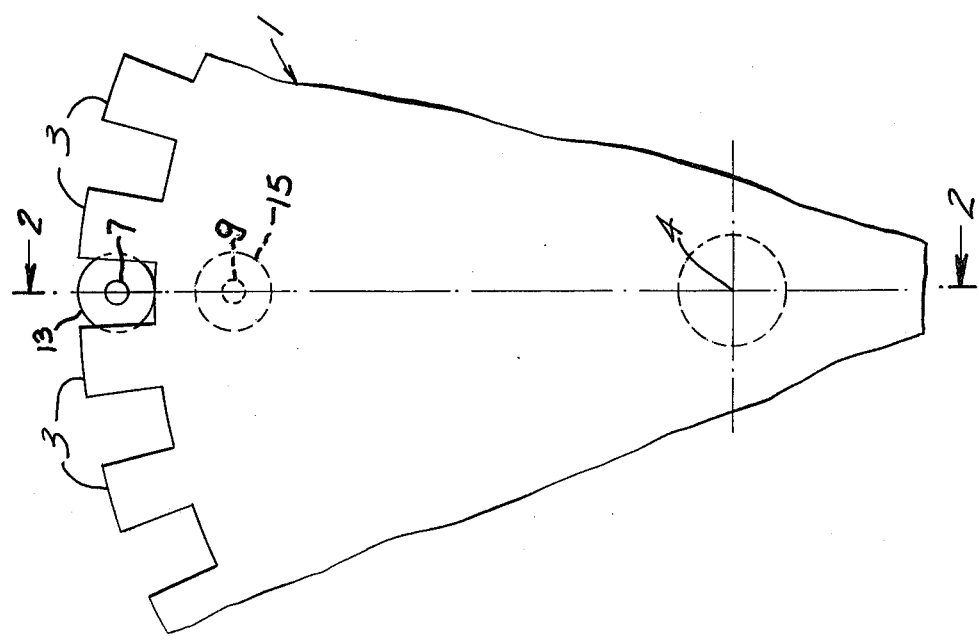

MAGNETIC SPEED SENSOR WITH COMPENSATING POLE

The present application is a continuation of application Ser. No. 478,988, filed Apr. 4, 1975.

The invention relates to adaptive braking systems for use on vehicles, such as automobiles or trucks, and more specifically to wheel speed sensors for providing the adaptive braking system with information relating to the speed and acceleration of the wheels. The invention can be used in the adaptive braking system described in U.S. Pat. No. 3,494,671 and may be applied to the wheel speed sensors described in U.S. Pat. Nos. 3,626,225; 3,626,226; 3,626,227; 3,626,228 and 3,629,635. All of the above patents are assigned to the same assignee as the present application.

The present invention reduces the effects of axial tone wheel misalignment and axial tone wheel vibrations. Axial tone wheel misalignment, such as run out or wobble, causes low frequency noise components in the speed signal and axial tone wheel vibrations cause high frequency noise components in the speed signal. In adaptive braking systems the speed signal is usually time differentiated to obtain an acceleration signal and this causes the noise components to reach excessive values. Of course, the low frequency noise components can be reduced to an acceptable level by close manufacturing tolerances and accurate alignment of the tone wheel, but the cost of this solution is much too high for automotive applications. The speed signal must be filtered to reduce the high frequency noise components.

The invention contemplates a speed sensor for a vehicle wheel comprising a tone wheel driven by the vehicle and subject to axial misalignment and vibration, the tone wheel being made of magnetic material and having a continuous portion and a toothed portion, and sensing means having a sensing pole at one side of the tone wheel proximate the toothed portion and a compensating pole at the same side of the tone wheel proximate the continuous portion and remote from the toothed portion, coil means on the poles, and means for magnetizing the poles to induce a signal voltage across the coil means corresponding to wheel speed and substantially free of noise components due to axial misalignment and vibration of the tone wheel upon relative rotation of the tone wheel and sensing means.

The present invention reduces the noise components to an acceptable level even when the tone wheel is warped and axially misaligned and subject to severe vibrations by using a compensating pole in addition to the sensing pole on the magnetic wheel speed sensor. The solution to the problem according to the invention is relatively inexpensive and more reliable and permits broad manufacturing tolerances.

BRIEF DESCRIPTION OF THE DRAWING

FIG. 1 is a side view of a wheel speed sensor constructed according to the invention, and FIG. 2 is a vertical section taken approximately on the line 2—2 of FIGURE.

DETAILED DESCRIPTION OF THE INVENTION

Referring to the drawing, the wheel speed sensor includes a tone wheel 1 of magnetic material having a series of equally spaced teeth 3 about its periphery and arranged for rotation about an axis 4. The spacing between the teeth preferably is the same size as the teeth. The tone wheel may be secured to the wheel hub and may be of relatively large diameter or it may be frictionally driven and of relatively small diameter as described in the above patents. The friction drive may be operated by the wheel or drive shaft or in any other suitable manner.

A magnetic sensor 5 has a sensing pole 7 and a compensating pole 9 secured to the ends of a permanent magnet 11 in U-shaped configuration. A sensing coil 13 is wound on sensing pole 7 and a compensating coil 15 is wound on compensating pole 9 and the coils are connected in series opposition.

The magnet sensor is mounted on a stationary part of the vehicle at one side of the tone wheel with sensing pole 7 and compensating pole 9 proximate the tone wheel. The sensing pole is located radially at tooth centers and is smaller than the teeth and the compensating pole is located radially inwardly from the sensing pole on the continuous portion of the tone wheel at a suitable distance from the teeth.

OPERATION

A signal voltage corresponding to wheel speed and including noise components due to axial misalignment and vibration of the tone wheel are generated in sensing coil 13 as teeth 3 on tone wheel 1 pass sensing pole 7. The noise components also are generated in compensating coil 15 as the air gap between tone wheel 1 and compensating pole 9 varies due to axial tone wheel misalignment and vibration. Since sensing coil 13 and compensating coil 15 are connected in series opposition, the noise components generated in the compensating coil due to misalignment and vibration cancel the corresponding noise components in the sensing coil resulting from the same causes. The output is a speed signal voltage substantially free of noise components. The change in flux through the compensating pole resulting from axial vibration and misalignment of the tone wheel may be greater than the corresponding change in flux in the sensing pole. In this event, the compensating coil preferably has a smaller number of turns than the sensing coil so that the noise voltage components cancel.

It has been found that magnetic cross coupling between the poles is negligible since the leakage permeability is much greater than the permeability change as the tone wheel teeth pass the sensing pole. Although only one permanent magnet is used in the embodiment shown and described the two poles essentially act as two separate sensors and provide the required noise component rejection. However, in some instances it may be desirable to use two separate sensors where more perfect compensation is required, but of course at additional expense.

A speed sensor constructed according to the invention reduces the noise component to an acceptable level even when the tone wheel is warped and actually misaligned and subject to severe vibration. The speed sensor is relatively inexpensive and more reliable than devices used heretofore and permits broad manufacturing tolerances.

What is claimed is:

1. A speed sensor for a vehicle wheel comprising a tone wheel driven by the vehicle and subject to axial misalignment and vibration, the tone wheel being made of magnetic material and having a continuous portion and a toothed portion, and sensing means having a sensing pole at one side of the tone wheel proximate the toothed portion and a compensating pole at the same side of the tone wheel proximate the continuous portion and remote from the toothed portion, coil means on the poles, and means for magnetizing the poles to induce a signal voltage across the coil means corresponding to wheel speed and substantially free of noise components due to axial misalignment and vibration of the tone wheel upon relative rotation of the tone wheel and sensing means.

2. A speed sensor as described in claim 1 in which the coil means includes a coil wound on the sensing pole for providing a signal voltage corresponding to wheel speed and to noise components due to axial misalignment and vibration of the tone wheel, and a coil wound on the compensating pole for providing a signal voltage corresponding to the noise components due to axial misalignment and vibration of the tone wheel, the coils being connected in series opposition to cancel the signal voltage due to the noise components.

3. A speed sensor as described in claim 1 in which the magnetizing means is a permanent magnet connected between the poles.

4. A speed sensor as described in claim 3 in which the permanent magnet and poles are arranged in U-shaped configuration with the ends of the poles proximate the tone wheel.

5. A speed sensor as described in claim 1 in which the toothed portion of the tone wheel comprises a plurality of equally spaced teeth and the spaces between the teeth are substantially the same size as the teeth and the sensing pole is smaller than the teeth.

* * * * *